United States Patent [19]
Alonso

[11] Patent Number: 6,061,683
[45] Date of Patent: May 9, 2000

[54] METHOD FOR REGULATING ACCESS OF COMPUTERS TO DATA OF A CENTRAL COMPUTER

[75] Inventor: Luis Alonso, Munich, Germany

[73] Assignee: Siemens Aktiengesellschaft, Munich, Germany

[21] Appl. No.: 09/032,674

[22] Filed: Feb. 27, 1998

[30] Foreign Application Priority Data

Feb. 27, 1997 [DE] Germany .......................... 197 08 021

[51] Int. Cl.$^7$ .................................................. G06F 17/30
[52] U.S. Cl. ............................... 707/8; 707/10; 707/201; 707/204; 709/221
[58] Field of Search .................................. 707/207, 8, 10, 707/201, 204; 709/221

[56] References Cited

U.S. PATENT DOCUMENTS

| | | | |
|---|---|---|---|
| 5,261,069 | 11/1993 | Wilkinson et al. ...................... | 395/425 |
| 5,729,735 | 3/1998 | Meyering ................................ | 707/10 |
| 5,737,738 | 4/1998 | Sharman ................................. | 707/201 |
| 5,813,017 | 9/1998 | Morris ..................................... | 707/204 |
| 5,913,213 | 6/1999 | Wikstrom et al. ......................... | 707/8 |

FOREIGN PATENT DOCUMENTS

| | | |
|---|---|---|
| 0 663 640.A1 | 7/1995 | European Pat. Off. . |
| 0633 640 A1 | 7/1995 | European Pat. Off. ........ G06F 17/30 |

OTHER PUBLICATIONS

Oracle: Oracle 7–Symmetrische Replikation, Asynchron Verteilte Technologie, Munich, 1995, pp. 1–12.
Oracle: Oracle Mobile Agents, Client/Agent/Server–Computing, Munich, 1996, pp. 5 and 6.
S. Jablonski et al., Datenkonsistenz in verteilten Systemen, in DE–Z Informationstechnik, it 33, 1991, 4 Seiten, pp. 175–184.

*Primary Examiner*—Anton W. Fetting
*Assistant Examiner*—Jean M. Cornelius
*Attorney, Agent, or Firm*—Hill & Simpson

[57] ABSTRACT

A method that regulates the access of a plurality of computers onto data of a central computer. Operations on local copies of a true subset by computers are thereby generally possible in the method. For synchronization, log files that contain the operations on the replicated data are sent to the central computer. When numerous conflicts due to the access of a plurality of computers to the same datasets on the central computer occur in the synchronization, the method can offer regulated access to the shared data and, thus, the resolution of the conflicts. This change in the operating mode for resolving conflicts given access to shared data can also ensue automatically with prescribable thresholds for acceptable and unacceptable numbers of collisions. When conflicts are to be generally avoided, the offers the service of transactions that are either completely executed or can be completely cancelled.

16 Claims, 7 Drawing Sheets

METHOD FOR REGULATING ACCESS OF COMPUTERS TO DATA OF A CENTRAL COMPUTER

BACKGROUND OF THE INVENTION

The invention is directed to a method for regulating access of computers to data of a central computer.

An excellent field for the application of computer systems in the storing and management of data. Sometimes data can be of an exclusively private nature and there is no interest of distributing or offering such data in the computer system to a plurality of users. A far greater quantity of data, however, should in fact be accessible or distributed: for example, data of a business area, project data or data of a work group.

The crucial questions with respect to the access to distributed data are:

1. How is it assured that the data are always in a validated condition (problem of multiple database organization)?

2. How are conflicts resolved given competing access to the same dataset?

There are various proposed solutions in order to assure consistency of data dependent on the field of application and the demands.

Figure 1:
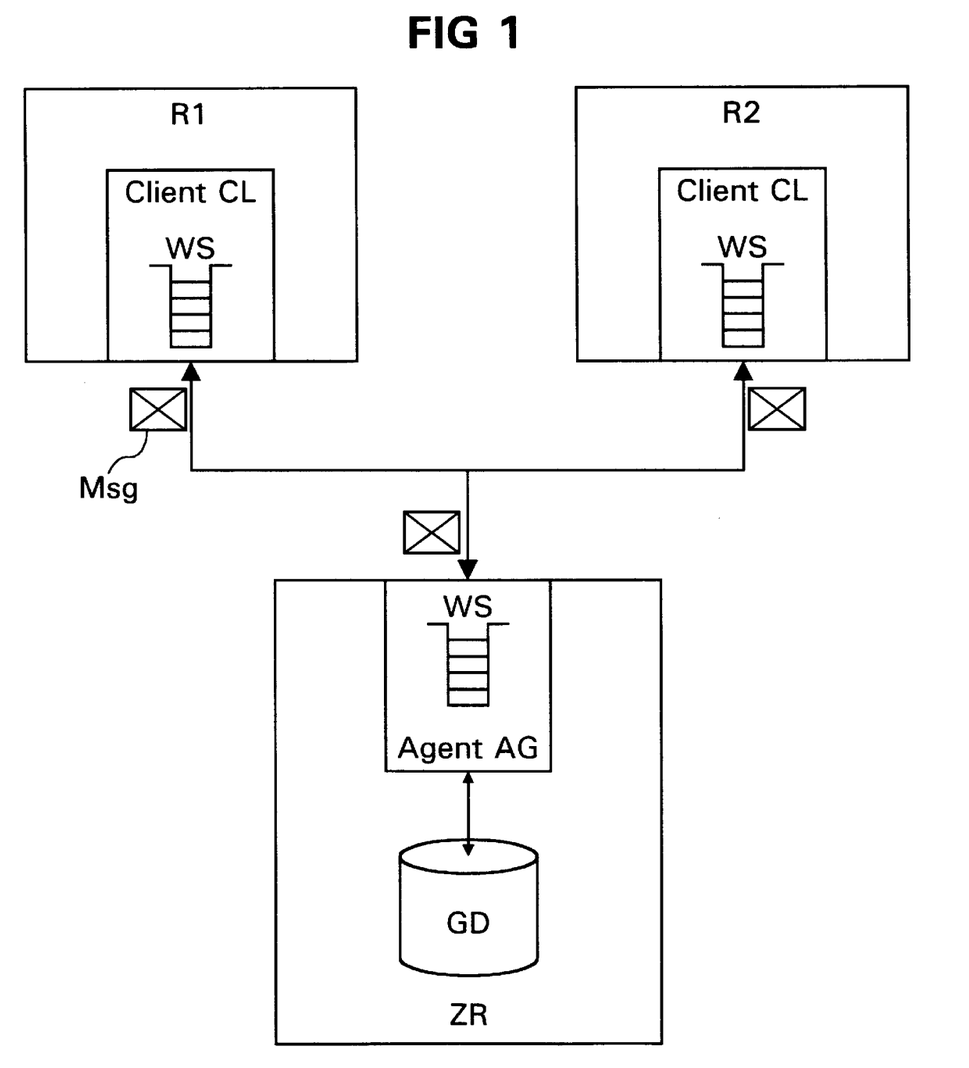
FIG. 1 is a schematic diagram that illustrates a prior art system described in *ORACLE: Oracle Mobile Agents. Client/Agent/Server Computing,* Munich 1996, pp. 5–6.

In the publication, *ORACLE: Oracle Mobile Agents. Client/Agent/Server Computing*, Munich 1996, pp. 5–6, there is disclosed an asynchronous data distribution method. Two computers, R1 and R2, have a limited number of commands available to them that are sent as messages Msg from a client CL on the computers R1 and R2 to an agent AG on a central computer ZR. This is illustrated in FIG. 1 herein. Since all messages Msg can usually not be immediately processed, both the client CL as well as the agent AG have waiting lists available to them. The commands sent in the form of messages Msg trigger pre-defined operations in the agent AG that the agent AG then carries out on shared data GD, for example via SQL (Structured Query Language). In this proposal, client CL and a data server, here, the central computer ZR, with the shared data GD are decoupled from one another.

What is disadvantageous about this asynchronous method are the limited flexibility that is established by the permanently prescribed operations on the data server, the use of the respective computer R1/R2 only as input/output interface without utilizing the calculating capacity on the computers R1/R2, and the availability of the central computer ZR given access of a plurality of computers R1/R2 to the shared data GD or given access via physically poor or, respectively, faulty communication lines. This asynchronous method is also referred to as a "pessimistic" method since the accesses of a plurality of computers R1/R2 to a set of shared data GD would lead to collisions without the asynchronous processing.

Figure 2:
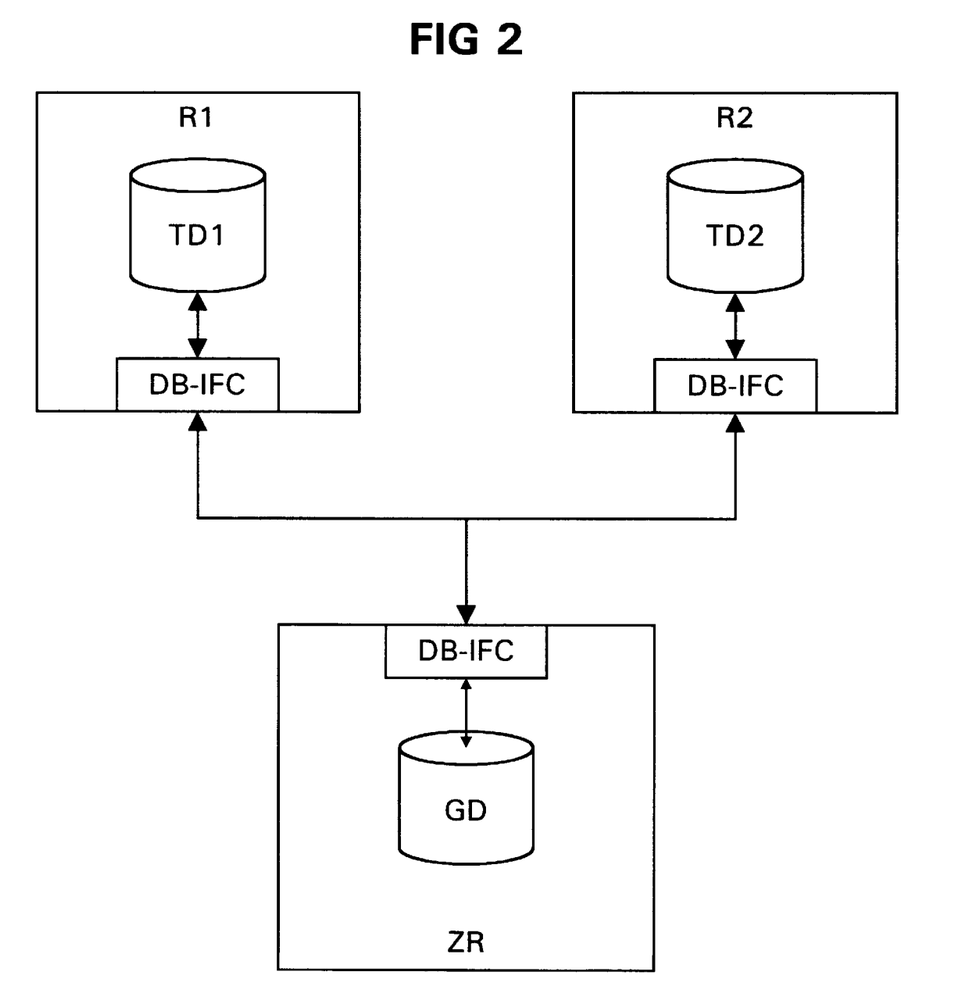
FIG. 2 is a schematic diagram that illustrates a prior art system described in ORACLE: *Oracle 7—Symmetrische Replikation, Asynchron Verteilte Technologie,* Munich 1995, pp. 1–12.

In the publication, *ORACLE: Oracle 7—Symmetrische Replikation, Asynchron Verteilte Technologie*, Munich 1995, pp. 1–12, there is further disclosed that the data access of a plurality of computers R1/R2 to shared data can be synchronously regulated in an "optimistic" method. This is illustrated in FIG. 2 herein. Partial data TD1/TD2 of the shared data GD are replicated on each computer R1 and/or R2, the partial data TD1 on the computer R1 and the partial data TD2 on the computer R2 in this example. Entirely or partly the same datasets can thereby be processed both on the computer R1 as well as on the computer R2. In the example indicated in FIG. 2, access to the individual datasets is regulated via a data bank interface DB-IFC.

In contrast to the asynchronous model described in FIG. 1, there is the possibility of working with a set of commands predetermined by the data bank interface DB-IFC on each computer R1/R2 without connecting to the central computer ZR. This is referred to as a "disconnected mode". The full flexibility of the data bank access is assured in this approach since the datasets are locally present and the data bank interface (for example, an SQL interface) is available for prescribable data ban operations. What is disadvantageous about the synchronous method of FIG. 2 in comparison to the asynchronous method described in FIG. 1 is the lack of assurance of consistent datasets. Instead, however, the availability of the data is correspondingly high since partial data can be maintained replicated on each computer R1/R2 and, thus, each computer R1/R2 has all possibilities of implementing operations on the locally present data that are prescribable by the data bank interface DB-IFC.

SUMMARY OF THE INVENTION

An object underlying the present invention is to make access to data of a central computer available to a plurality of computers with high availability and assurance of data consistency or with a combination of these two properties corresponding to the respective application.

In an embodiment, the invention provides a method for regulating access of remote computers to data of a server computer, comprising the steps of:

a) storing a prescribable portion of the data of the server computer on a first computer as a first copy;

b) performing at least one operation effecting a modification of the first copy on the first computer, by generating a second copy of the first copy and performing the at least one operation on the second copy;

c) storing the at least one operation effecting a modification in a first command sequence;

d) matching the data on the server computer with the data of the second copy on the first computer by transmitting the first command sequence from the first computer to the server computer and executing first command sequence on the server computer;

e) matching the first copy to the second copy by transmitting a second command sequence that takes a modification of the data on the server computer that relate to the first copy into consideration from the server computer to the first computer and executing that command sequence on the first computer on the first copy;

f) whereby, when a second computer has modified that part of the data of the central computer of significance for the first computer since the creation of the first copy on the first computer, this modification performed on the data by the second computer is taken into consideration in the matching of the first copy on the first computer in that a third command sequence, which represents a modification performed by the second computer, is taken into consideration in the second command sequence in step e) insofar as the prescribable portion of the data of the first copy of the first computer is affected.

In an embodiment, the invention comprises a method for replicating database modifications of data shared among a plurality of computers, comprising the steps of:

a) providing a database on a first computer;

b) generating on a second computer a first copy of at least a portion of said database;

c) generating on said second computer a second copy of said portion of said database;

d) modifying said second copy;

e) storing information relating to said modification in a first command sequence;

f) transmitting said first command sequence from said second computer to said first computer;

g) modifying said database by executing at least said first command sequence on said first computer;

h) transmitting from said first computer to said second computer a second command sequence containing commands for replicating modifications made to said first database within said portion corresponding to said first copy;

I) executing said second command sequence on said second computer.

In the inventive method, the availability of the data is achieved by an architecture expansion relating to the database organization and the access to the data. Consistency and a dependable communication are assured by a means for synchronization.

In order to distinguish more clearly between a computer accessing shared data such as a remote computer and a central computer such as a local computer or server, the term "mobile computer" is used below instead of the term "accessing computer." This designation is not to be interpreted as a limitation but is intended instead to make the following explanations clearer. Further, the term "central computer" is replaced by the term "stationary computer" in order to assure a conceptual pendant suited to the term "mobile computer."

In accordance with the invention, a mobile resource manager MRM represents the interface on the mobile computer to the data that is visible for the application. The MRM has a locally replicated data unit available to it that represents a copy of an arbitrary size of the shared data. Modifications of the replicated data unit implemented on the mobile computer lead to a provisional data unit that represents an unconfirmed copy of the respectively most recent replicated data unit. All locally implemented accesses on the mobile computer without connection to the shared data on the stationary computer are carried out on this provisional data unit. High availability is thus advantageously assured since the application can access the locally existing data, the provisional data unit, at any time.

The stationary computer SR has a primary resource manager PRM available to it that contains the shared data. These shared data represent the validated original data.

Commands that lead to a modification of the provisional data unit on the mobile computer are deposited in a log file. In order to synchronize the provisional data unit with the shared data on the stationary computer, the command sequence contained in the log file is transmitted to the stationary computer. This corresponds to an authorization inquiry at the PRM. Authorized modifications are returned to the MRM in an authorization reply and the replicated data unit is modified on the mobile computer according to the authorization reply. It should be noted that modifications that derive from other mobile computers can also be contained in the authorization reply. Thus, via the shared data on the stationary computer, the replicated data unit contained on the mobile computer is synchronized with other mobile computers.

A data synchronization system DSS is employed as a means for synchronization. This component is present both on every mobile computer as well as on the stationary computer. On the mobile computer, the DSS manages the sequences of modifications that lead from a replicated data unit to a provisional data unit. On the stationary computer, the DSS manages modification sequences that are necessary for the updating of the replicated data units on the individual mobile computers. The correct allocation of corresponding changes to the respective mobile computers is the job of the DSS.

It is advantageous when the DSS enables the locking of a data unit, so that a specific mobile computer has exclusive access to the shared data for a prescribable time duration. Over and above this, it can be advantageous that the MRM locks the stationary computer as soon as the conflict rate in the transmission exceeds a specific, prescribable threshold in order to modify data only in the exclusive access to the shared data and, thus, to avoid conflicts, i.e. accesses of other mobile computers (pessimistic method). When the probability for the occurrence of a conflict is deemed low, then data units can be modified without locking of the stationary computer. This reduces the communication outlay that is needed for maintaining consistency (optimistic method).

A further advantageous employment of the inventive method is comprised in the definition of transactions for assuring high demands made of the consistency of the data. It is characteristic of a transaction that it is executed either entirely or not at all. Further, a transaction is composed of a plurality of commands that can also access different datasets. When a transaction cannot be carried out for various reasons, for example, due to an interruption of the physical connection to the stationary computer, then it is important to be able to completely cancel the transaction. Suitable protocol mechanisms must be implemented to this end. It is thereby to be assured both on the mobile computer as well as on the stationary computer that the transaction can be cancelled.

It is also advantageous when, alternatively to a command sequence, the corresponding data unit can also be transmitted. This is applicable given many operations on small data units.

These and other features of the invention are discussed in greater detail below in the following detailed description of the presently preferred embodiments with reference to the accompanying drawings.

DETAILED DESCRIPTION OF THE PRESENTLY PREFERRED EMBODIMENTS

Figure 3:
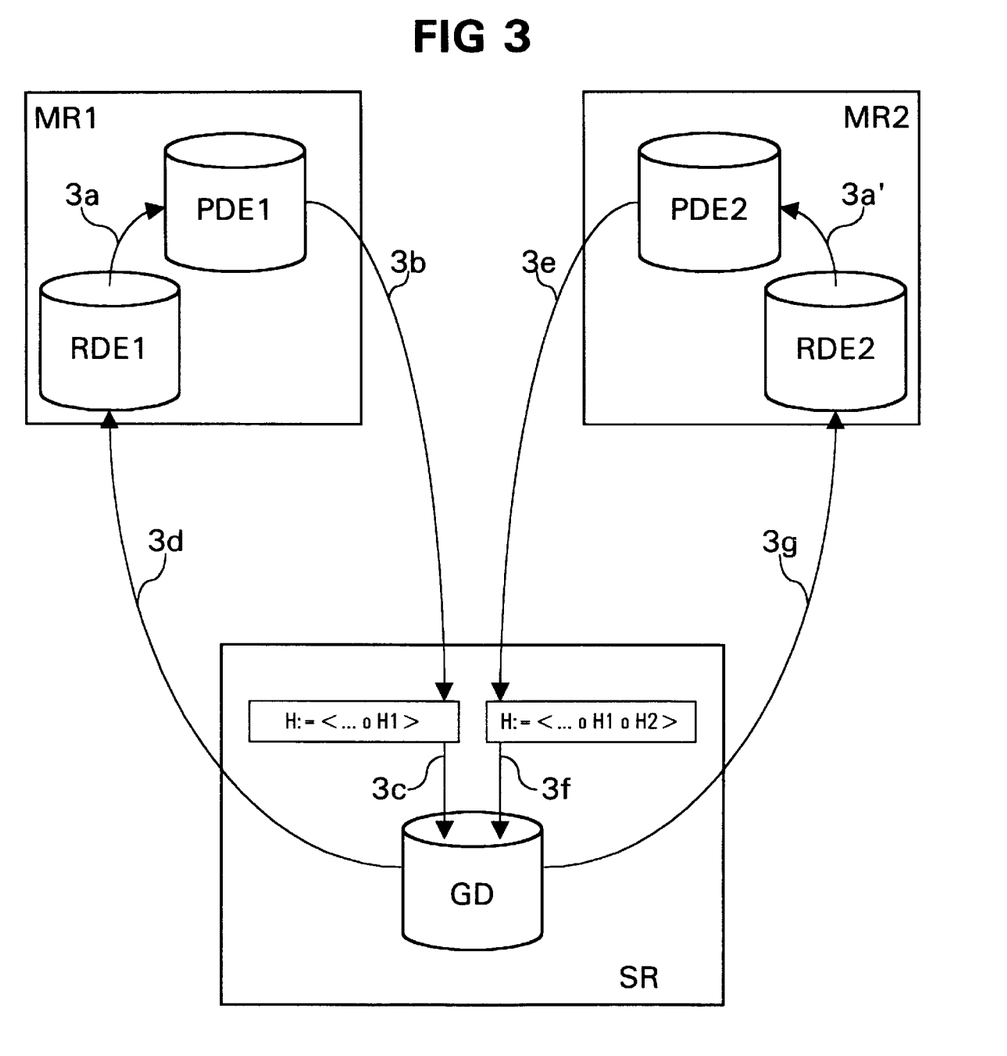
FIG. 3 is a schematic diagram that illustrates the interaction between replicated and provisional data units on mobile computers with the shared data on the stationary computer in accordance with principles of the invention.

FIG. 3 shows how two mobile computers MR1 and MR2 can communicate with a stationary computer SR in accordance with the invention. The mobile computers MR1 and MR2 thereby contain replicated data units RDE1 and RDE2, respectively, and provisional data units PDE1 and PDE2, respectively. The shared data GD are present on the stationary computer SR. Means for accessing the data or for the synchronization of the data are considered in greater detail with reference to FIG. 4.

In a first step 3a, a first operation H1 is carried out on the replicated data unit RED1 of the mobile computer MR1. This leads to the provisional data unit PDE1 on the mobile computer MR1. In the next step 3b, the provisional data unit PDE1 of the mobile computer MR1 is to be synchronized with the shared data GD on the stationary computer SR. To that end, the first operation H1 is transmitted to the stationary computer SR. An operation of the data with the first operation H1 is implemented on the stationary computer SR. In a step 3c, the first operation is carried out on the shared data according to the following operation rule:

$$H := <\ldots o\, H1> \quad (1),$$

whereby o references a general operation operator that indicates that the first operation H1 is entered into the list of overall operations H.

Presented graphically, one can also imagine the overall operation H as an archival list of all operations performed on the shared data. This shall be discussed in greater detail with reference to FIG. 5.

The adaptation of the shared data GD corresponds to a differential update by the first operation H1. The entire data unit is not transmitted from the mobile computer MR1 to the stationary computer SR; instead, a log file with the commands that were performed on the most recently validated, replicated data unit RDE1 is transferred. Let it thereby be noted that the first operation formed the basis by way of example and that this can also contain a sequence of operations (command sequence) that is utilized for the differential update of the shared data GD.

In step 3d, a confirmation of the synchronization is sent to the mobile computer MR1. As a result thereof, an update of the replicated data unit RDE1 occurs in that the log file sent in the confirmation from the stationary computer SR is worked into the replicated data unit RDE1 and, thus, the replicated data unit RDE1 is put into a validated condition. The part of the shared data that is available replicated on the mobile computer MR1 is again identical to the shared data GD corresponding to this part.

Since it can be characteristic for mobile computers MR1 and MR2 to modify data of a local data bank without permanent connection to the stationary computer SR, it is not automatically assured in the example shown in FIG. 3 that, following a modification of the shared data GD by the mobile computer MR1, a synchronization of the data on the other mobile computer MR2 is assured, since the mobile computer MR2 could be temporarily unavailable. Further, let it be assumed that a connection is always initiated from a mobile computer MR1 and/or MR2.

Let it be assumed in the present example that the replicated data units RDE1 and RDE2 are not disjunctive, i.e., the above-described modification of the shared data GD is also of significance for the data unit RDE2 replicated on the mobile computer MR2, since these data units are no longer validated due to the modification on the part of the mobile computer MR1. A synchronization eliminates this deficiency, whereby the synchronization according to the normal functioning of mobile computers in systems without permanent connection to the stationary computer is initiated by the mobile computer, MR2 in this case.

In the other case of disjunctive data, i.e. independent partial data on the mobile computers MR1 and MR2, conflicts cannot arise according to the example illustrated in FIG. 3 since the replicated part of the shared data on the respective mobile computer is independent of the respectively other part of the replicated data.

When the mobile computer MR2 has undertaken no modifications of the replicated data unit RDE2, then the replicated data unit RDE2 is synchronized in that the log file H1 is transmitted from the stationary computer SR. In this case, conflicts do not occur since, in conformity with the assumption, no modifications at the replicated data unit RDE2 were undertaken on the mobile computer MR2.

In the other case, the mobile computer MR2 also performed modifications on the replicated data unit RDE2, indicated in FIG. 3 by a second operation H2 (can also be a plurality of operations combined in a log file) in the step 3a'. The modification is intermediately stored on the mobile computer MR2 in the provisional data unit PDE2, which is to be synchronized in a step 3e. It is assumed in the illustrated example that the mobile computer MR1 previously performed modifications on the data unit (see first operation H1) and, thus, the mobile computer MR2 implemented the second operation H2 on an unvalidated version of the replicated data unit RDE2. A conflict can thus arise when the two operations H1 and H2 access the same dataset.

In general, a conflict indicates a possible inconsistency of one or more datasets. Inconsistencies arise when various mobile computers modify the same dataset in different ways.

When that case is considered in greater detail wherein the mobile computer MR2 wishes to synchronize datasets that were previously modified by the mobile computer MR1, then there is the possibility that the commands—the second operation H2 here, by way of example—communicated in FIG. 3 (step 3e) for the synchronization of the provisional data unit PDE2 cannot be integrated into the shared data GD. An inconsistent condition of the shared data GD could be achieved given an integration since it is assumed on the mobile computer MR1 that the data unit RDE1 replicated thereat is validated and consistent with the shared data GD. The provisional data unit PDE2 on the mobile computer MR2 can thus have achieved a non-confirmable condition. In order to resolve this conflict, as many commands as possible (when the second operation H2 is composed of a sequence of operations) are worked into the shared data GD on the stationary computer SR.

Let it thereby be noted that the log file for the modifications on the first mobile computer and the log file for the modifications on the second mobile computer need not necessarily effect conflicts, even when they are not disjunctive. When the log file H2 converts the shared data GD into a non-inconsistent condition, then the commands of the log file H2 can be validated, i.e. implemented on the shared data GD.

The commands that in fact lead to conflicts on the shared data GD must be stored separately from the shared data GD. It is thus assured that the modifications that were undertaken on the mobile computer MR2 are not lost. As needed, these modifications can likewise be validated. Ultimately, a decision about which modification enters into the shared data can be made automatically by functions that, for example, pursue specific strategies, for example the newest modification of a dataset is the valid one, or can be made manually. A further example that is concerned with the resolution of conflicts is described with reference to FIG. 5.

For the sake of completeness, it should also be mentioned that, even when the data units replicated on the mobile computers MR1 and MR2 are not disjunctive, it is nonetheless possible that the first operation H1 (as described above) is implemented first and the second operation, initiated by the mobile computer MR2, can be subsequently implemented, since the operations H1 and H2 do not cause a conflict. The modification of the shared data ensues in step 3f, and the overall operation H is composed of the first operation H1 and of the second operation H2:

$$H:=<\ldots o\ H1\ o\ H2> \qquad (2)$$

An update of the replicated data unit RDE2 is implemented in step 3g, taking the modification due both to the first operation H1 as well as to the second operation H2 into consideration. It should be especially noted that the modification carried out by the first operation H1 on the mobile computer MR1 now enters into the validated condition of the replicated data unit RDE2 on the mobile computer MR2.

Figure 4:
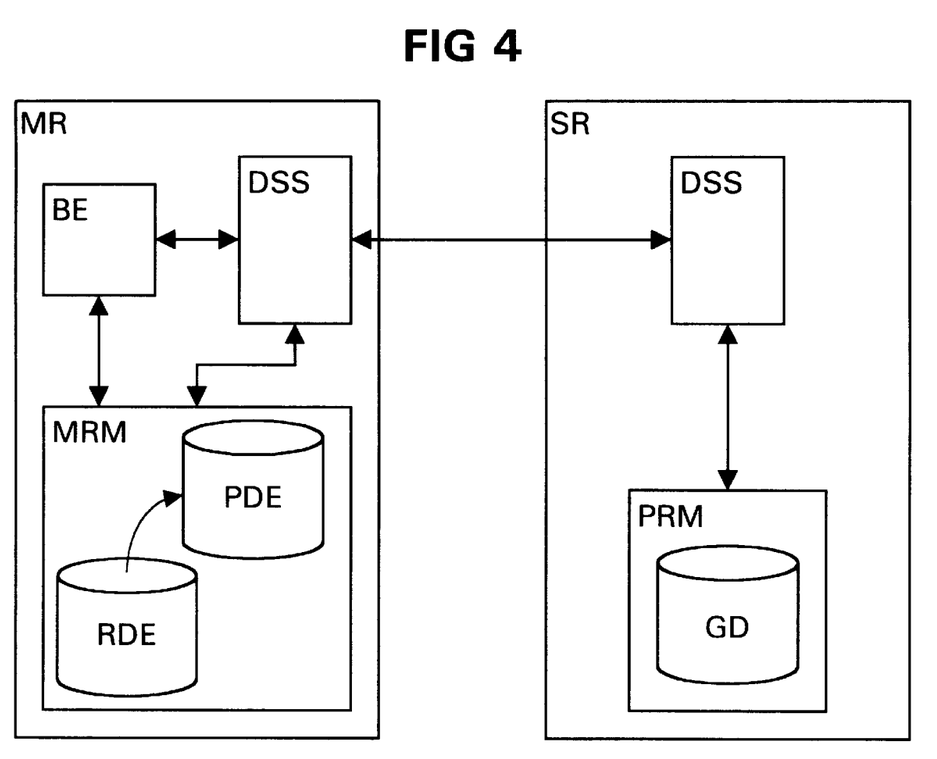
FIG. 4 is a block diagram that shows the functional units of the inventive method.

FIG. 4 shows a block diagram that contains components with whose assistance the inventive method is implemented. FIG. 4 shows a mobile computer MR and a stationary computer SR. A mobile resource manager MRM represents the interface on the mobile computer MR to the data. Further, the MRM assures the consistency, of the data that are deposited in individual objects (data objects, datasets). The data objects are stored as replicated data unit and as provisional data unit, which arises by applying operations to the replicated data unit. In detail, the MRM has the following interfaces available to it: First, it offers the user BE an application interface to the data objects that can be prescribably fashioned according to the respective field of application. Second, the MRM has an interface to the data synchronization system DSS on the basis whereof the data objects are synchronized.

The data synchronization system DSS is present both on the mobile computer MR as well as on the stationary computer SR and connects the mobile computer MR to the stationary computer SR. Further, the DSS works completely asynchronously and encapsulates the communication relationship between the two resource managers MRM and PRM, i.e. both MRM and PRM communicate with one another without having knowledge of the embodiment of the connection between the mobile computer MR and the stationary computer SR. The log file is implemented in the DSS, this log file containing the individual commands that were carried out on the respective mobile computer MR and that converted data objects of the replicated data unit RDE into the provisional data unit PDE.

The primary resource manager PRM is a component on the stationary computer that assures that the shared data GD always contain the most current, validated version of data.

Figure 5:
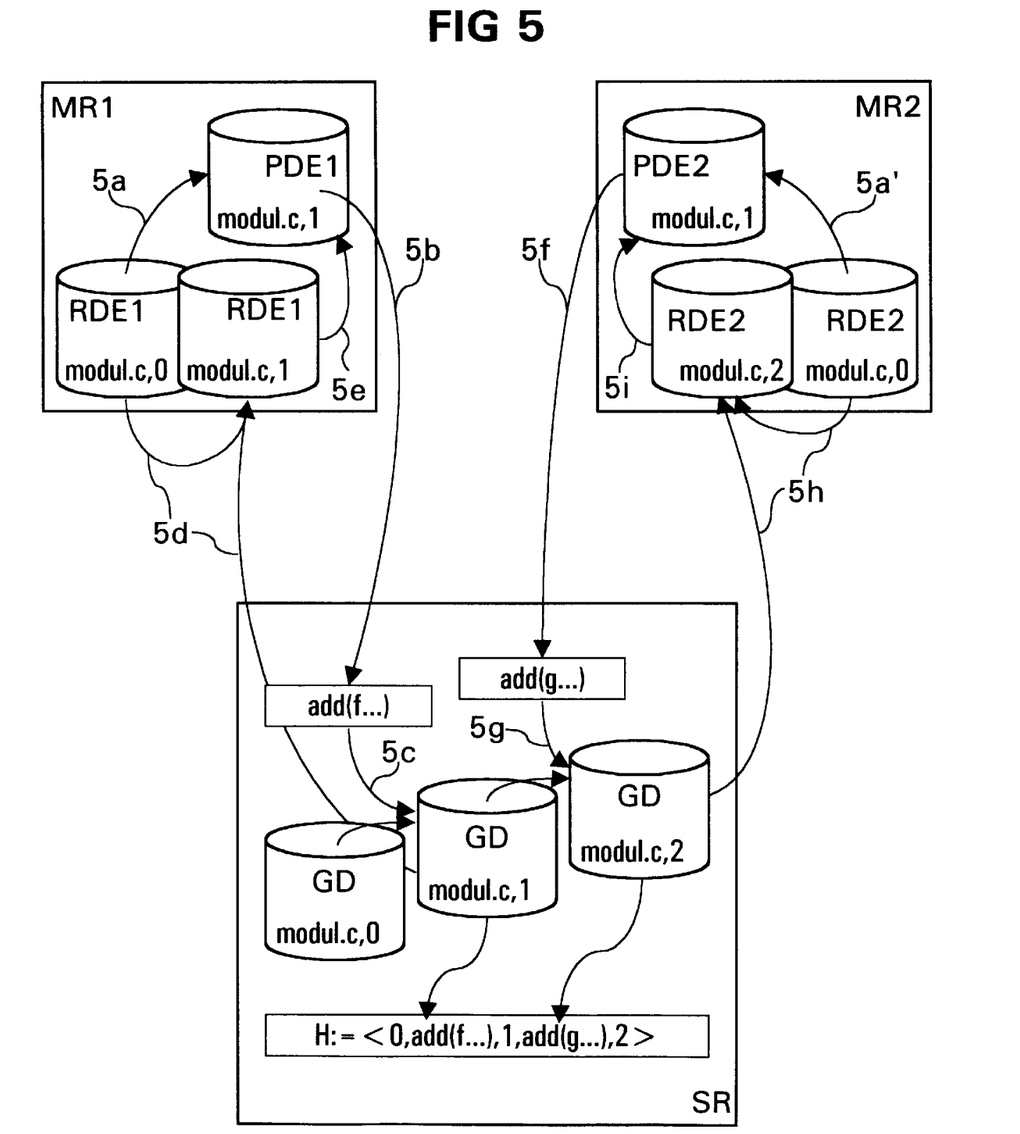
FIG. 5 is a diagram that illustrates the executive sequence of the inventive method given low demands made of the synchronization of the data units.

FIG. 5 shows the functioning of the inventive method under the premise of rarely occurring synchronizations (low synchronization mode=operating mode with seldom occurring synchronization requests). In this case, the additional outlay (overhead) for communication between the mobile computer and the stationary computer due to synchronizations is kept as low as possible. The application on the mobile computer performs operations on the provisional data unit PDE. The MRM deposits these operations in a log file.

Before a log file is transmitted from the mobile computer MR1 to the stationary computer SR, it is advantageous to filter it. All commands that are of no significance for the synchronization process are thereby removed from the log file. Such operations are or include:

1. Phantom operations that were performed on data objects that do not exist at all or no longer exist since they were deleted;

2. Read-only operations that performed no modification at the replicated data unit;

3. Compensatory operations, i.e. operations that cancel one another such as, for example, the creation and subsequent deletion of a data object.

A datafile "modul.c" of a programming environment is considered in the example in FIG. 5. Alternatively, this can thereby be a matter of any type of distributed data that also need not be present completely replicated on the respective mobile computers. The notation "modul.c,0" is employed in the example of FIG. 5, this stating that the datafile (to be equated with a data object or, respectively, a datase) "modul.c" is present in the version 0, i.e. without having experienced a modification in the example.

A respective user at the mobile computer MR1 and at the mobile computer MR2 work on the datafile "modul.c" arranged distributed. In step 5a, a new function f is defined on the mobile computer MR1, i.e. is inserted into the datafile "modul.c". As described in great detail above, a provisional data unit PDE1 arises, this differing in content from the replicated data unit RDE1 to the effect that it additionally contains a dataset, i.e. the function f. This provisional dataset PDE1 is unconfirmed in view of the validated, shared data GD. In step 5b, the synchronization of the provisional data unit PDE1 is initiated by the mobile computer MR1.

In the example, the log file that was generated on the mobile computer MR1 contains the operation (or command) about the addition of the function f:

$$\text{add}(f\ldots) \qquad (3).$$

This notation is to be understood as purely symbolic and merely serves for illustrating the events shown in the example.

In step 5c, the data synchronization system DSS on the stationary computer SR attempts to integrate the operation (3) into the shared data GD. A log file, illustrated in FIG. 3 by the list of overall operations H, is compiled on the stationary computer SR for each modification. Given a successful integration of the operation (3) into the shared data GD, a modification of the version of the shared data arises in step 5c, as illustrated by the change from "modul.c, 0" to "modul.c,1". This does not mean that both datafiles must in fact be extant; on the contrary, only one datafile "modul.c" in the respectively validated version is extant. The list of overall operations H serves for being able to replicate the version changes and the operations connected therewith (in the example, only one operation for clearer illustration but without limiting effect), this having the following content after step 5c in the illustrated example:

$$H:=<0,\text{add}(f\ldots),1> \qquad (4),$$

i.e. a new version "1" is generated (step 5c) from the datafile "modul.c" with the version "0" by performing the operation (3). AN integration of the operation (3) without conflict (collision) was thereby assumed.

In step 5d, the mobile computer MR1 receives a log file that led to a new validated version "modul.c,1" of the shared data GD on the stationary computer SR and applies this to the replicated data unit RDE1 "modul.c,0" on the mobile computer MR1, a change of the replicated data unit RDE1 from "modul.c,0" to "modul.c,1" following therefrom. Since the log file transmitted to the mobile computer MR1 from the stationary computer SR is the same in the example as the log file transmitted in step 5*b*—the operation (3) was added—, the provisional data unit PDE1 can be set as new, validated, replicated data unit RDE1 (step 5*e*). The replicated data unit RDE1 is synchronized with the shared data GD.

Let it now be assumed that a function g is added to the datafile "modul.c,0" in the step 5*a*' on the mobile computer MR2, the function g being added to the data unit RDE2 replicated thereat according to $$\text{add}(g. \ldots) \tag{5}.$$

A synchronization is initiated by the mobile computer MR2 in step 5*f*. According to the log file transmitted in step 5*f*, the function g added on the mobile computer MR2, which is different from the function f previously added on the mobile computer MR1 in the example, is successfully integrated in the step 5*g*. As in the integration in step 5*c*, a new version of the shared data "modul.c,2" is also formed here, and the modification is stored in the list of overall operations H, which has the following appearance after the implementation of the step 5*g*:

$$H:=<0,\text{add}(f. \ldots),1,\text{add}(g. \ldots),)2> \tag{6}.$$

Proceeding from the version "1", a new version "2", i.e. the datafile "modul.c,2", has arisen due to the operation (5) performed on the shared data under the assumption that no collision occurs.

The confirmation about the successful adding of the function g is sent to the mobile computer MR2 together with the information about the modifications of the shared data GD since the last updating of the replicated data unit RDE2 on the mobile computer MR2 (step 5*h*). The log file transmitted from the stationary computer SR to the mobile computer MR2 in step 5*h* and the log file transmitted from the mobile computer MR2 to the stationary computer SR in step 5*f* are different (by contrast to the comments about steps 5*d* and 5*e*).

In the case of a successful synchronization, the log file in step 5*h* represents a set including subsets of the log file in step 5*f*. By implementing the log file transmitted in step 5*h* on the replicated data unit RDE2, a new version of the replicated data unit RDE2 arises that contains both the successfully attached function g on the mobile computer MR2 in the step 5*a*' (operation (5)) as well as the function f attached on the mobile computer MR1 in the step 5*a* (operation (3)). For consistency reasons, the provisional data unit PDE2 is updated according to the status of the replicated data unit RDE2.

It was assumed in the above described example that a mobile computer MR1 attaches a function f and a mobile computer MR2 attaches a function g to the shared data. According to the above description, the attaching of disjunctive data objects does not lead to a conflict. Further, however, it is possible that a function f is likewise added to the shared data on the mobile computer MR2. In the step 5*g* (integration), this leads to a collision since one and the same dataset is accessed by two mobile computers MR1 and MR2. The log file, which is transmitted to the mobile computer MR2 in step 5*h* as confirmation of the modifications, then only contains the modifications (here: operation (3)) on the shared data GD implemented by the mobile computer MR1 and validated. The replicated data unit RDE2 on the mobile computer MR2 will not take into consideration the change added on the mobile computer MR2, i.e., the adding of a function f of the same name. So that this modification implemented on the mobile computer MR2 is not lost, however, a derived data object on the mobile computer MR2 is instanced. This derived data object contains the modifications that are proposed by the mobile computer MR2. What is to be done with the derived data object is thus subject to the user's control. When the user of the mobile computer MR2 considers it unacceptable that the modification that he performed on the datasets not be entered into the shared data GD, then a more sophisticated development of the method can be used which is presented in FIG. 6. This method assures that every user at every mobile computer can really implement modifications on the shared data.

Further, an automatic equilization or consolidation can be taken into account such that specifically prescribed procedures examine the two data objects and an attempt is thereby made to automatically accede to the user wishes in view of a new validated version of the shared data. A prescribable prioritization for conflict resolution is thereby to be programmed into the procedures application-dependent in the production of a new, consistent version of the shared data.

When a data object on the stationary computer is locked by a mobile computer, it is then assured for a prescribable time duration that this mobile computer has exclusive access to this locked data object.

The inventive method is developed so that an optimistic or a pessimistic operating mode of the method can be applied.

What is to be understood by "optimistic operating mode" is that the accesses of a plurality of mobile computers to shared data do not exceed a prescribable number of conflicts that is considered acceptable in the sense of the operating mode. By contrast thereto, the number of conflicts and the inconsistencies following therefrom in the sense of the respective application are unacceptable in the "pessimistic operating mode." In the "pessimistic operating mode," thus, the access to the shared data is implemented under the condition of the locking of these shared data for other mobile computers. Such an exclusive access of a mobile computer to the shared data assures that the modifications performed on the replicated data also take effect on the shared data.

The change in operating mode (optimistic or pessimistic) can ensue automatically in response to a prescribable event that is determined by the following parameters that are made available to the data synchronization system on the stationary computer:

1. A parameter whsize that indicates the number of operations that are to be taken into consideration for deciding whether the optimistic or the pessimistic operating mode is the preferred operating mode;

2. A parameter 1th that indicates a prescribable lower limit for the number of conflicts within the most recent whsize operations under which the optimistic operating mode is implemented;

3. A parameter hth that indicates a prescribable upper limit for the number of conflicts within the most recent whsize operations above which the pessimistic operating mode is applied.

The determination of the upper limit hth and of the lower limit 1th is application-dependent.

The two parameters 1th and hth have the purpose of prevent the occurrence of hysteria in the change between optimistic and pessimistic operating mode.

Figure 6:
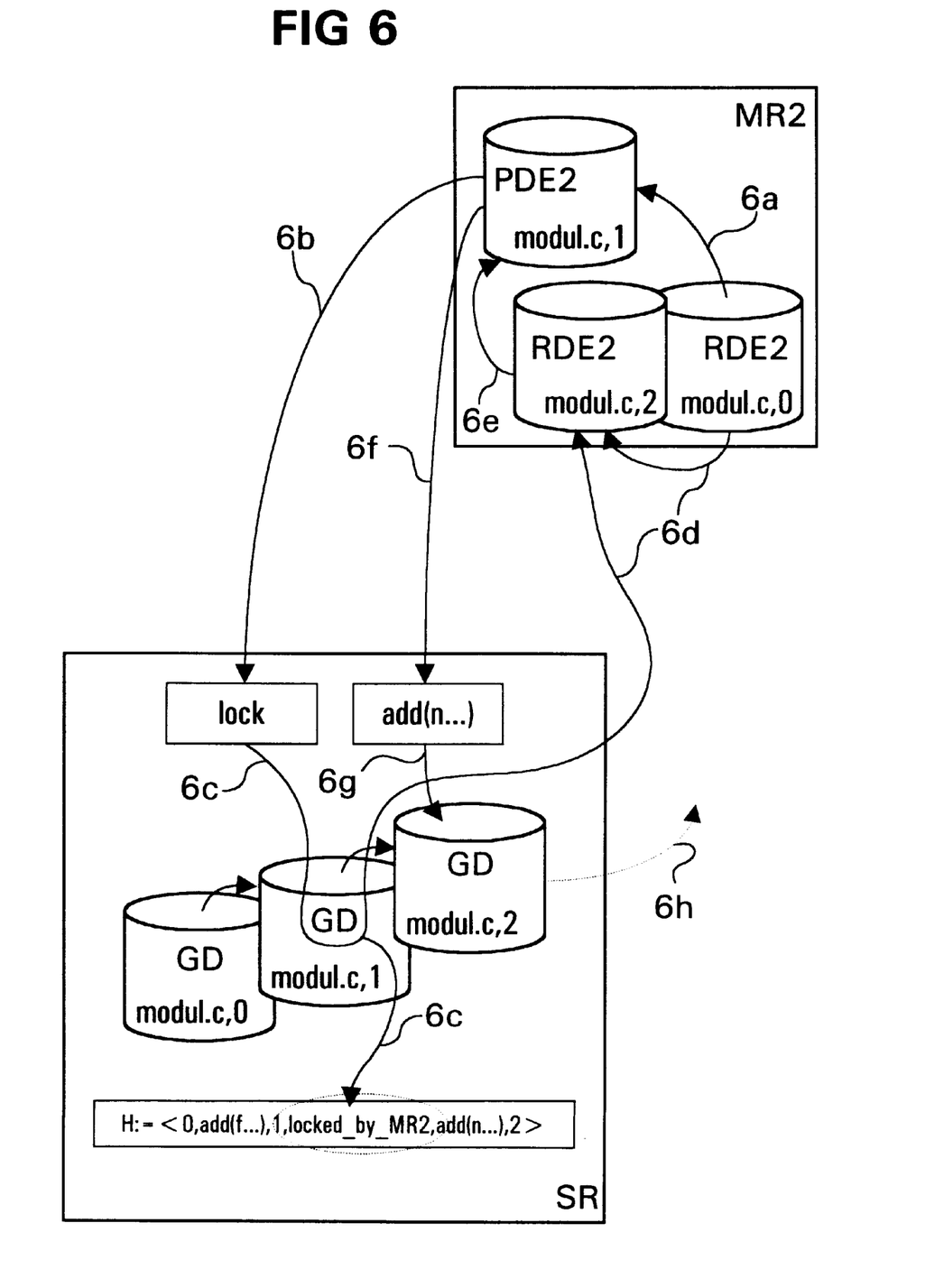
FIG. 6 is a diagram that illustrates locking for the exclusive use of the shared data proceeding from one mobile computer in accordance with principles of the invention.

FIG. 6 shows the locking of the shared data GD, initiated by a mobile computer MR. FIG. 6 is thereby to be viewed in conjunction with FIG. 5.

A function n according to the operation $$\text{add}(n. . .) \tag{7}$$

is inserted into the replicated data unit RDE2 on the mobile computer MR2 in step 6a. As described in detail above, the provisional data unit PDE2 thereby arises. The replicated data unit RDE2 remains unmodified since only operations confirmed by the stationary computer SR are implemented therein, and, thus, the consistency of the replicated data unit RDE2 with the shared data GD on the stationary computer SR is assured.

The synchronization of the data objects, i.e. both of the replicated data unit RDE2 as well as of the provisional data unit PDE2, is initiated in a step 6b in that the operation (7) is transmitted in a log file in addition to a locking request to the shared data GD on the stationary computer SR.

In the step 6c, the datafile "modul.c" is exclusively reserved (locked) for employment by the mobile computer MR2. The datafile "modul.c" is thus inhibited for all mobile computers other than the mobile computer MR2.

This locking always leads to an updating both of the replicated data unit RDE2 (step 6d) as well as of the provisional data unit PDE2 (step 6a).

After this updating, the user of the mobile computer MR2 sees the existing definition of the function f that was previously inserted by the mobile computer MR1 (see FIG. 5). He thus sees the current status of the shared data GD. Correspondingly, the user can insert a function with a different name, the function n here with the operation (7) by way of example (see FIG. 6, step 6f), or modify the existing function, delete it or otherwise perform actions dependent on the field of application and authorization. It is indicated in a further step 6g that an integration of the operation (7) is applied to the shared data and the datafile "modul.c,1" is thereby converted into a new version "modul.c,2". The list of the overall operations H, which was expanded by an entry in step 6c that shows that the shared data GD are used by the mobile computer MR2, is expanded such that the following is valid:

$$H:=<\text{add}(f. . .),1,\text{locked\_by\_}MR2,\text{add}(n. . .),2> \tag{8}$$

Let it be expressly pointed out here that the shared data in this example is completely replicated on the mobile computers, for example as a datafile "modul.c". According to the inventive method, however, only a part of the data can also be applied replicated and arbitrary data objects (datasets) can be employed.

The entry "add(f. . .)" in the list of overall operations H in equation (8) refers to FIG. 5 and the operation (3) described there. FIG. 6 is to be viewed as a partial illustration of FIG. 5 expanded by the property of the mechanism connected with the locking.

Step 6g is followed by further steps that again initiate and implement the update of the replicated data unit RDE2 and of the provisional data unit PDE2, indicated by an introductory step 6h. This occurs analogous to FIG. 5.

In the example in which the datafile "modul.c" is part of a programming environment, an overloaded definition of the function f (as method) can also be added in the case of an object-oriented programming language after the user has learned—by the synchronization implicit in the locking—of a potentially existing function f with other parameters.

The expansion in the locking of the shared data GD is comprised therein that, in the described case, the operation implemented on the mobile computer MR2 by the user acts on the shared data GD.

Over and above this, it is advantageous when the locking for the exclusive use of a single mobile computer is affected by a prescribable time duration whose transgression results in the cancellation of the locking. It is thus assured that a mobile computer does not lock the shared data for longer than a prescribable time.

A development of the inventive method is comprised in defining transactions as a sequence of individual operations that experience a special handling in that they are an indivisible unit. It is possible that the individual operations within a transaction influence different datasets. A premise for transactions is comprised therein that they modify the global condition of the system in that all operations of the respective transaction are executed therein or that the system continues to exist in the condition that prevailed before the execution of an individual command of the transaction in case the transaction cannot be completely executed. This property conditions a mechanism that can cancel individual operations contained in the transaction. In order to assure these cancel steps, the MRM keeps provisional data units ready. If the transaction succeeds, this is accompanied by an updating and validation of all provisional data units.

A further important property is comprised therein that the transaction converts the condition of a system from one consistent condition into another consistent condition. Provisionally inconsistent conditions can be extant within the transaction that, in case a transaction miscarries, must be converted back into the most recent consistent condition before the implementation of the transaction.

The modifications of the data objects undertaken in the transaction are invisible for the user until the transaction is successfully concluded. After the successful conclusion of the transaction, the result is persistently maintained and can no longer be cancelled.

Figure 7:
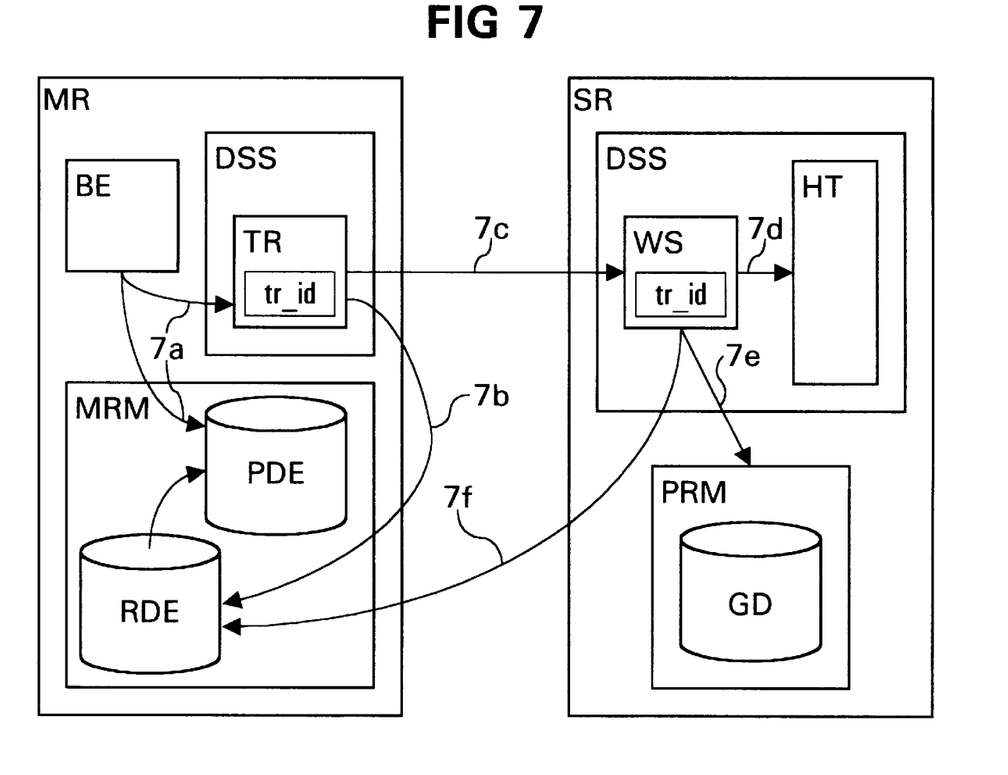
FIG. 7 is a diagram that shows how an exemplary transaction sequences between mobile computer and stationary computer in accordance with principles of the invention.

The execution of a transaction is illustrated in FIG. 7. The individual phases of the transaction are explained in greater detail below, given the assumption that the transaction can be successfully implemented.

The transaction is initiated in step 7a, for example by the user BE. The individual operations (commands) of the transaction are implemented on the provisional data unit PDE of the MRM. When an error occurs during the transaction, all steps of the transaction can be cancelled in that the provisional data unit PDE is equated with the replicated data unit RDE. All operations of the transaction are stored in a transaction dataset TR. All data objects that are affected by a transaction have no unconfirmed conditions after the transaction, whether successful or not. In the example recited in FIG. 7, one respective customer account and one respective vendor account are created in the provisional data unit. One transaction object represents the interaction of user and DSS. The operations "deposit" and "withdrawal" are stored in the transaction dataset TR referred to the respective accounts.

Step 7b shows an MRM validation phase in which the MRM decides whether a transact on satisfies the consistency demands. For example, a check can thereby be carried out to see whether enough money is available for the purchase or, respectively, the debiting from the customer account. When the decision of the MRM about the implementation of the transaction is positive, then the transaction experiences a preliminary confirmation. The result thereof is that it would survive a local outage on the mobile computer. In case of an outage, a log file is investigated to see whether transactions that have received a preliminary confirmation are contained therein. In this case, (at least) one new provisional data unit is created in which the logged commands are executed on the replicated data unit. One can subsequently proceed as before the outage of the mobile computer.

The data synchronization system DSS receives the request from the MRM and send the transaction dataset, which is provided with a specific identification $tr_{13}$ id, to the data synchronization system DSS on the stationary computer SR (see step 7c).

The PRM validation phase in step 7d takes place on the stationary computer SR. Preliminarily confirmed transactions are inserted into a wait list WS. It is thus assured that one transaction is always carried out at a time, and inconsistencies between transactions cannot occur.

The PRM update phase in which the transaction is applied to the shared data GD is initiated in the step 7e. As soon as all operations of the transaction having the identifier tr_id have been carried out, the transaction dataset is deleted. The DSS on the stationary computer SR confirms the implementation of the transaction by sending an update dataset.

The MRM update phase is implemented in the step 7f in that the data synchronization system DSS on the mobile computer MR receives a confirmation about success or miscarriage of the transaction having the identifier tr_id. When the transaction was successfully implemented, then the replicated data unit RDE is brought to the current condition according to the shared data GD (update). When, by contrast, the transaction miscarried, then the modifications in the provisional data unit PDE effected by the transaction do not enter into the replicated data unit RDE.

Although modifications and changes may be suggested by those skilled in the art, it is the intention of the inventors to embody within the patent warranted hereon all changes and modifications as reasonably and properly come within the scope of their contribution to the art.

What is claimed:

1. A method for regulating access of remote computers to data of a server computer, comprising the steps of:
   a) storing a prescribable portion of the data of the server computer on a first computer as a first copy;
   b) performing at least one operation effecting a modification of the first copy on the first computer, by generating a second copy of the first copy and performing the at least one operation on the second copy;
   c) storing the at least one operation effecting a modification in a first command sequence;
   d) matching the data on the server computer with the data of the second copy on the first computer by transmitting the first command sequence from the first computer to the server computer and executing first command sequence on the server computer;
   e) matching the first copy to the second copy by transmitting a second command sequence that takes a modification of the data on the server computer that relate to the first copy into consideration from the server computer to the first computer and executing that command sequence on the first computer on the first copy; and
   f) whereby, when a second computer has modified that part of the data of the server computer of significance for the first computer since the creation of the first copy on the first computer, this modification performed on the data by the second computer is taken into consideration in the matching of the first copy on the first computer in that a third command sequence, which represents a modification performed by the second computer, is taken into consideration in the second command sequence in step e) insofar as the prescribable portion of the data of the first copy of the first computer is affected.

2. The method according to claim 1, whereby a transaction that is composed of the first command sequence is cancelled given an interruption of the transaction until a more recent consistent condition has been restored.

3. The method according to claim 1, whereby the data on the server computer and the first copy on the first computer are locked for the exclusive use for the first computer for a prescribable time duration.

4. The method according to any one of the claims 1 to 3, whereby the second copy of the first computer is transmitted to the server computer instead of the first command sequence and data of the server computer corresponding to the first copy on the first computer are transmitted from the server computer to the first computer instead of the second command sequence.

5. The method according to one of the claims 1 through 3, whereby the first and second command sequences only contain operations that lead to modifications on the respective data, and operations that cancel one another out are not transmitted in a command sequence.

6. A method for regulating access of remote computers to data of a server computer, comprising the steps of:
   a) storing a prescribable portion of the data of the server computer on a first computer as a first copy;
   b) performing at least one operation effecting a modification of the first copy on the first computer, by generating a second copy of the first copy and performing the at least one operation on the second copy;
   c) storing the at least one operation effecting a modification in a first command sequence;
   d) matching the data on the server computer with the data of the second copy on the first computer by transmitting the first command sequence from the first computer to the server computer and executing first command sequence on the server computer; and
   e) matching the first copy to the second copy by transmitting a second command sequence that takes a modification of the data on the server computer that relate to the first copy into consideration from the server computer to the first computer and executing that command sequence on the first computer on the first copy;
   whereby,
   when a second computer has modified that part of the data of the server computer of significance for the first computer since the creation of the first copy on the first computer this modification performed on the data by the second computer is taken into consideration in the matching of the first copy on the first computer in that a third command sequence, which represents a modification performed by the second computer, is taken into consideration in the second command sequence in step e) insofar as the prescribable portion of the data of the first copy of the first computer is affected;
   the data on the server computer and the first copy on the first computer are locked for the exclusive use for the first computer for a prescribable time duration; and
   the lock for computers accessing the data of the central computer is triggered as soon as a first prescribable threshold, above which a number of conflicts within a specific number of past accesses onto the data of the server computer that can no longer be accepted is exceeded.

7. The method according to claim 6, whereby the lock for computers accessing the data of the central computer is automatically cancelled as soon as a second prescribable threshold, below which an acceptable number of conflicts within the specific number of past accesses to the data of the central computer is acceptable is not exceeded following an exceeding of the first threshold.

8. The method according to claim 7, whereby a prescribable time period defines an upper threshold for the longest locking of a first or second computer of data of the server computer.

9. A method for replicating database modifications of data shared among a plurality of computers, comprising the steps of:
   a) providing a database on a first computer;
   b) generating on a second computer a first copy of at least a portion of said database;
   c) generating on said second computer a second copy of said portion of said database;
   d) modifying said second copy;
   e) storing information relating to said modification in a first command sequence;
   f) transmitting said first command sequence from said second computer to said first computer;
   g) modifying said database by executing at least said first command sequence on said first computer;
   h) transmitting from said first computer to said second computer a second command sequence containing commands for replicating modifications made to said first database within said portion corresponding to said first copy; and
   i) executing said second command sequence on said second computer.

10. The method according to claim 9, whereby a transaction that is composed of the first command sequence is cancelled given an interruption of the transaction until a more recent consistent condition has been restored.

11. The method according to claim 9, whereby the portion of the database corresponding to the first copy on the first computer and the first copy on the second computer are locked for the exclusive use for the second computer for a prescribable time duration.

12. The method according to any one of the claims 9 to 11, whereby the second copy on the second computer is transmitted to the first computer instead of the first command sequence and data of the first computer corresponding to the first copy on the second computer are transmitted from the first computer to the second computer instead of the second command sequence.

13. The method according to one of the claims 9 through 11, whereby the first command sequence only contains commands relating to operations that lead to modifications of data, and commands relating to operations that cancel one another out are not transmitted in the first command sequence.

14. A method for replicating database modifications of data shared among a plurality of computers, comprising the steps of:
   a) providing a database on a first computer;
   b) generating on a second computer a first copy of at least a portion of said database;
   c) generating on said second computer a second copy of said portion of said database;
   d) modifying said second copy;
   e) storing information relating to said modification in a first command sequence;
   f) transmitting, said first command sequence from said second computer to said first computer;
   g) modifying said database by executing at least said first command sequence on said first computer;
   h) transmitting from said first computer to said second computer a second command sequence containing commands for replicating modifications made to said first database within said portion corresponding to said first copy; and
   i) executing said second command sequence on said second computer;
   wherein
   the portion of the database corresponding to the first copy on the first computer and the first copy on the second computer are locked for the exclusive use for the second computer for a prescribable time duration; and
   the lock for the data of the first computer is triggered as soon as a first prescribable threshold, above which a number of conflicts within a specific number of past accesses onto the data of the first computer that can no longer be accepted is exceeded.

15. The method according to claim 14, whereby the lock for the data of the first computer is automatically cancelled as soon as a second prescribable threshold, below which an acceptable number of conflicts within the specific number of past accesses to the data of the first computer is acceptable is not exceeded following an exceeding of the first threshold.

16. The method according to claim 15, whereby a prescribable time period defines an upper threshold for the longest locking of the second computer of data of the first computer.

* * * * *